United States Patent [19]
Barnhart et al.

[11] 3,862,332
[45] Jan. 21, 1975

[54] METHOD OF LOWERING SERUM CHOLESTEROL

[75] Inventors: James W. Barnhart, Indianapolis; Philip J. Shea, Zionsville, both of Ind.

[73] Assignee: The Dow Chemical Company, Midland, Mich.

[22] Filed: Nov. 19, 1969

[21] Appl. No.: 878,256

Related U.S. Application Data

[63] Continuation-in-part of Ser. No. 637,635, May 11, 1967, abandoned.

[52] U.S. Cl. .............................................. 424/337
[51] Int. Cl. .......................................... A61k 27/00
[58] Field of Search ......... 260/609 F; 424/335, 337; 500/637, 635

[56] References Cited
UNITED STATES PATENTS

3,129,262   4/1964   Laufer .............................. 260/578

OTHER PUBLICATIONS

Derwent Farmdoc No. 34,790, Neth. 68–06010, Published Nov. 12, 1968, pages 37–45.

*Primary Examiner*—Jerome D. Goldberg
*Attorney, Agent, or Firm*—Maynard R. Johnson

[57] ABSTRACT

Methods useful for lowering serum cholesterol in animals comprising administration to the animal of a hypocholesteremic amount of a bis(dialkylphenol) ketone mercaptole compound or a bis(dialkylphenol) mercaptal compound, preferably bis(3,5-di-tert-butyl-4-hydroxyphenyl) acetone mercaptole, and compositions to be employed in practicing the method.

16 Claims, No Drawings

METHOD OF LOWERING SERUM CHOLESTEROL

CROSS-REFERENCE TO RELATED APPLICATION

This is a continuation-in-part of our copending application, Ser. No. 637,635, filed May 11, 1967, and now abandoned.

BACKGROUND OF THE INVENTION

The compounds employed in the method and composition of the present invention can be prepared by the reaction of an appropriate ketone or aldehyde with an appropriate substituted 4-mercaptophenol according to classical procedures for the synthesis of mercaptals and mercaptoles. Representative procedures are described by Migrdichian, Organic Synthesis, Vol. 1, Reinhold Publishing Corporation, New York (1957) pp. 203-4; and Reid, Organic Chemistry of Bivalent Sulfur, Volume III, Chemical Publishing Co., Inc., New York, (1960), pages 320-330. Procedures useful in preparing 4-mercaptophenols are described, for example, in U.S. Pat. No. 3,129,262.

SUMMARY OF THE INVENTION

This invention relates to novel compositions and methods for using the same for reducing the concentration of cholesterol in the blood of animals. More particularly, the invention is directed to novel pharmaceutical compositions and methods for using the same to reduce cholesterol levels in the blood of vertebrate animals wherein the compositions contain a hypocholesteremic amount of a bis(dialkylphenol) ketone mercaptole compound or bis(dialkylphenol) mercaptal compound.

It is an object of this invention to provide novel pharmaceutical compositions which have the effect of lowering blood cholesterol upon the administration of such compositions to animals. A further object of this invention is to provide a novel method for lowering blood cholesterol in animals. A further object of this invention is to provide novel compositions which have the effect of lowering serum cholesterol in warm-blooded animals and which have low toxicity and little or no pharmacological effects in other areas at dosage levels consistent with good hypocholesteremic, hypocholesterolemic or cholesterol-lowering activity. It is a further object of this invention to provide novel compositions which have the effect of lowering blood cholesterol in animals and which exert little or no estrogenic effect at dosage levels consistent with good hypocholesteremic activity. A further object of the invention is to provide a method and compositions useful for the alleviation of hypercholesteremia in mammals.

It has been found that the serum cholesterol level of warm-blooded animals may be lowered by administering to the animal a hypocholesteremic amount of a substituted compound or a composition or dosage unit form containing the same, the substituted compound being an S, S'-di-substituted aldehyde mercaptal or an S, S'-di-substituted mercaptole of a ketone containing from 3 to 6 carbom atoms, inclusive, wherein the substituents are 3-tertiary-alkyl-4-hydroxy-5-loweralkylphenyl groups in which the tertiary alkyl groups are tertiary butyl groups and the loweralkyl groups are methyl, ethyl, propyl or butyl, providing that when the compound is an aldehyde mercaptal each phenyl group is substituted with two tertiary butyl (tert-butyl) groups and the compound is an acetaldehyde mercaptal, such compounds corresponding to the formula

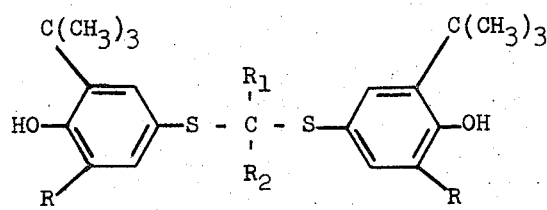

In the present specification and claims, R in each occurrence thereof independently represents loweralkyl of from one, to two, to three, to four carbon atoms, inclusive; $R_1$ represents hydrogen or methyl, and $R_2$ represents methyl, ethyl, propyl or isobutyl, with the proviso that when $R_1$ represents hydrogen, $R_2$ represents methyl and R represents tertiary butyl, that is, when $R_1$ represents hydrogen, the compound is bis(3,5-di-tert-butyl-4-hydroxyphenyl) acetaldehyde mercaptal. It is generally preferred to employ a compound wherein R, in both occurrences thereof, represents the same loweralkyl moiety of from one to four carbon atoms, inclusive. Another preferred group of compounds are those wherein $R_2$ represents methyl, ethyl, normal propyl or isobutyl. A particularly preferred group of compounds for use in the practice of the invention comprises the bis(3-tert-butyl-4-hydroxy-5-loweralkylphenyl) ketone mercaptoles corresponding to the above formula wherein $R_1$ is methyl, such ccompounds wherein R in each occurrence thereof represents the same loweralkyl moiety being also preferred. Another preferred group of compounds are those corresponding to the above formula wherein R, in each occurrence thereof, represents the same loweralkyl moiety selected from the group consisting of methyl, ethyl, isopropyl and tertiary butyl and wherein $R_1$ represents methyl and $R_2$ represents methyl. Another preferred group comprises the bis(3,5-di-tert-butyl-4-hydroxyphenyl) ketone mercaptole compounds of the above formula, the compound bis(3,5-di-tert-butyl-4-hydroxyphenyl) acetone mercaptole being particularly preferred for use in the composition and method of the invention.

For the sake of convenience, compounds having the above-described chemical structures will be referred to hereinafter as "substituted ketone mercaptole" compounds.

It has been found that the substituted ketone mercaptole compounds used in accordance with the invention, when administered to animals and in particular to mammals, have the effect of lowering the blood cholesterol content, that is, the amount of cholesterol in the blood of the animal to which is administered the active ingredients of the invention. The compounds can be administered orally or parenterally by subcutaneous, intravenous or intraperitoneal injection or by implantation or the like, oral administration being preferred. The substituted ketone mercaptole compounds are preferably administered as pharmaceutical compositions in dosage unit form. Such compositions can be prepared by known techniques, for example, tableting or encapsulation. The dosage units preferably contain from about 100 to about 200 to about 500 milligrams to about 1 to about 5 grams of the active ingredient. Dosage units, adapted for oral administration, such as tablets, capsules, lozenges and the like, preferably contain from about 100 to about 500 milligrams of the substituted ketone mercaptole compound. The compounds can also be administered as compositions adapted to be fed as part or all of the animal diet.

In forming the compositions of the invention, the active substituted ketone mercaptole compound is incorporated in a pharmaceutical carrier. In the present specification and claims, the term "pharmaceutical carrier" refers to pharmaceutical excipients and includes nutritive compositions such as a solid or liquid foodstuff. In the present specification and claims, "pharmaceutical excipient" refers to known pharmaceutical excipients which are substantially non-toxic and non-sensitizing at dosages consistent with good hypocholesteremic activity. A preferred pharmaceutical carrier is a surface-active dispersing agent.

Suitable solid pharmaceutical carriers which can be employed for formulating the compositions of the invention include starch, lactose, glucose, sucrose, gelatin, microcrystalline cellulose, powdered licorice, powdered tragacanth, malt, rice flour, silica gel, magnesium stearate, magnesium carbonate, hydroxypropyl methyl cellulose, chalk and the like, and compatible mixtures thereof. In the preparation of solid compositions, the active ingredient can be triturated with a solid pharmaceutical carrier or mixtures thereof, or otherwise mechanically milled to obtain a uniform mixture. The mixtures can be compressed into tablets or filled into capsules by known procedures, or they can be employed as powders or the like. The solid compositions generally contain from about 0.02 to about 90, inclusive, percent by weight of the active ingredient.

Among the liquid pharmaceutical carriers which can be utilized are ethyl alcohol, propylene glycol, polyethylene glycols, peanut oil, corn oil, water, saline solution, glycerine and water mixtures, glucose syrup, syrup of acacia, mucilage of tragacanth and the like, and compatible mixtures thereof.

The compositions can also contain the active ingredient in admixture with surface-active dispersing agents and, optionally, an inert carrier. Suitable surface-active dispersing agents include natural phosphatides such as lecithin, natural gums such as gum acacia and gum tragacanth, condensation products of ethylene oxide with fatty acids, such as polyoxyethylene stearate, condensation products of ethylene oxide with fatty alcohols such as heptadecaethyleneoxycetanol and esters or partial esters of fatty acids with a hexitol or hexitol anhydride, and their condensation products with ethylene oxide, such as sorbitan monooleate, polyoxyethylene sorbitan monooleate and polyoxyethylene sorbitol monooleate. Such compositions can be in the form of emulsions, suspensions or dispersible powders or granules, and the compositions containing surface-active dispersing agents can also be in the form of tablets, capsules, or the like.

The substituted ketone mercaptole compounds can be formulated as oil-in-water or water-in-oil emulsions wherein a solution of the active ingredient in a mineral oil such as liquid paraffin or a vegetable oil such as peanut oil, sunflower seed oil or corn oil or mixtures thereof constitutes the oil phase. Emulsions are prepared with the aid of dispersing agents or emulsifying agents such as lecithin, sorbitan trioleate, polyoxyethylene sorbitan monooleate, gum acacia and gum tragacanth. The substituted ketone mercaptole compounds can also be formulated as suspensions in a suitable liquid pharmaceutical carrier. Suspensions are prepared with the aid of dispersing agents such as lecithin or polyethylene oxide condensation products of alkylphenols, of fatty acids or of fatty alcohols and suspending agents, for example, cellulose derivatives such as methyl cellulose, carboxymethyl cellulose or hydroxypropylmethyl cellulose, sodium alginate, gum acacia and gum tragacanth, or compatible mixtures thereof. The suspensions can be prepared by adding the finely divided active ingredient to water containing dispersing agents or suspending agents and passing the mixture through a colloid mill or the like. The liquid pharmaceutical compositions can include from about 0.02 to about 50 percent of the active ingredient. The dispersible powders and granules contain the active ingredient in admixture with a dispersing agent and a suspending agent. Such compositions are adapted to be used for the preparation of aqueous suspensions by the addition of water. Suitable dispersing agents and suspending agents are those described above. The dispersible powders and granules generally contain from about 0.02 to about 90 percent of the active ingredient.

The pharmaceutical compositions described above can also contain, in addition, sweetening agents such as sugar, saccharin or the like, flavoring agents such as caramel, preservatives such as ethyl p-hydroxybenzoate, antioxidants such as ascorbic acid and suitable coloring materials.

The active substituted ketone mercaptole compounds can also be incorporated in a foodstuff such as, for example, butter, margarine, edible oils and the like. The substituted ketone mercaptole compounds can also be prepared in the form of a nutritive composition in which the active ingredient is mixed with vitamins, fats, proteins or carbohydrates and the like, or mixtures thereof. Such compositions can be prepared in liquid form such as emulsions or suspensions, as well as in solid form. The nutritive compositions are adapted to be administered as the total diet, as a part of the diet or as a supplement to the diet. The nutritive compositions preferably contain from about 0.02 to about 2 percent of the active ingredient when administered as the total diet. The compositions can contain higher concentrations of the active ingredient when administered as a supplement.

The substituted ketone mercaptole compounds can also be formulated as concentrated compositions which are adapted to be diluted by admixture with liquid or solid foodstuffs. The concentrated compositions are prepared by mechanically milling or otherwise mixing the active ingredient with an inert carrier such as silica gel, soluble casein, starch or the like, or mixtures thereof. The concentrated compositions can also include additional ingredients such as vitamins, preservatives, antioxidants and flavoring agents. Such compositions contain from about 5 to about 90 percent of the active ingredient.

The hypocholesteremic (or hypocholesterolemic) amount of the substituted ketone mercaptole compounds to be administered to an animal, that is, the amount which is effective to significantly lower the serum cholesterol level, can vary depending upon such factors as the animal treated, the particular substituted ketone mercaptole compound employed, the desired serum cholesterol level to be obtained, whether or not the animal is hypercholesteremic (or hypercholesterolemic), that is, having abnormally elevated serum cholesterol levels, the period of administration and the method of administration. For example, serum cholesterol levels can be reduced by about 25 percent when bis(3,5-di-tert-butyl-4-hydroxyphenyl) acetone mercaptole is administered to mice by incorporation of amounts of 0.02 percent of the substituted ketone mercaptole compound in the diet for a period of two weeks. Substantial reductions in serum cholesterol levels in mice can also be obtained by administration of 100 milligrams per kilogram per day of bis(3,5-di-tert-butyl-4-hydroxyphenyl) acetone mercaptole by intraperitoneal injection of a solution of the substituted ketone mercaptole in peanut oil. Substantial reductions of serum cholesterol levels in monkeys can be obtained when flavored aqueous suspensions of bis(3,5-di-tert-butyl-4-hydroxyphenyl) acetone mercaptole are administered orally to the monkeys at a dosage rate of 200 milligrams per kilogram per day. In general, the substituted ketone mercaptole compounds can be administered internally in daily dosages of from one milligram or less, to about three to about five, to about 15, to about 50, to about 100, to about 200, to about 300, to about 500 milligrams and about 5 grams of the active ingredient per kilogram of body weight of the animal to be treated. A daily dosage of between about 2 and about 300 milligrams of active ingredient per kilogram of body weight is preferred.

The substituted ketone mercaptole compounds which are employed as the active ingredients in the compositions and methods of the invention are prepared by the reaction of acetaldehyde or a ketone containing from 3 to 6 carbon atoms with a suitable substituted 4-mercaptophenol. In a preferred procedure, the substituted 4-mercaptophenol is dissolved in an inert organic solvent such as methanol and a catalytic amount of hydrochloric acid (such as about 0.05 molar proportion of hydrochloric acid for each molar proportion of 4-mercaptophenol) is added. A ketone as described above is added typically by employing 0.5 or more molar proportion of ketone for each molar proportion of 4-mercaptophenol and the mixture is heated for a short period of time. For example, good results are obtained when the reaction mixture is maintained at a temperature of from about 30°C. to the boiling point of the reaction mixture for from about one to about 6 hours. In a typical procedure heat is evolved when the reactants are contacted and mixed, and the reaction mixture is subsequently heated, if necessary, to maintain the temperature within the above-stated range. The reactants may be contacted and mixed under an inert gas by conventional procedures such as employing a nitrogen purge or the like, or the reaction may be carried out under air. The substituted ketone mercaptole product can be separated by conventional procedures such as evaporation, extraction, filtration, decantation, centrifugation and the like. The substituted ketone mercaptole compound can be purified by conventional procedures such as washing and recrystallization.

Representative substituted 4-mercaptophenols which can be employed to prepare the substituted ketone mercaptole compound employed in the compositions and methods of the invention include 2,6-di-tert-butyl-4-mercaptophenol, 2-tert-butyl-6-ethyl-4-mercaptophenol, 2-tert-butyl-6-methyl-4-mercaptophenol and 2-tert-butyl-6-isopropyl-4-mercaptophenol. Representative procedures for the preparation of such compounds are found in U.S. Pat. No. 3,129,262.

Using substantially the same procedure and employing the above-described reactants, catalyst and solvent and a named 4-mercaptophenol and ketone, the following substituted ketone mercaptole compounds are prepared.

Bis(3,5-di-tert-butyl-4-hydroxyphenyl) acetone mercaptole, melting at 125°–126°C., is prepared by employing 2,6-di-tert-butyl-4-mercaptophenol and acetone as starting materials. In one representative procedure, the 2,6-di-tert-butyl-4-mercaptophenol (47.5 grams; 0.2 mole) is dissolved in methanol (50 milliliters) heated at a temperature of 50°C. A catalytic amount of concentrated hydrochloric acid (1 milliliter) is added, followed by acetone (5.8 grams; 0.1 mole). The temperature of the mixture rises to about 60°C., and is maintained at about 60°–65°C. for 1.5 hours. The mixture is cooled, diluted with water and about 10 milliliters of aqueous sodium bicarbonate and extracted with ether. The ether extract is evaporated, and the product is obtained as a residue, which is recrystallized from ethanol and then from isopropanol to obtain the bis(3,5-di-tert-butyl-4-hydroxyphenyl) acetone mercaptole as a crystalline solid melting at about 125°–126°C. In another representative procedure about 2.3 moles of 2,6-di-tert-butyl-4-mercaptophenol is dissolved in about 1700 milliliters of methanol under a nitrogen atmosphere; about 100 milliliters of concentrated hydrochloric acid and 180 milliliters of acetone are added, and the mixture is stirred and maintained at a temperature of about 35°–50°C. for 1.5 hours. The mixture is then cooled to room temperature and filtered, and the bis(3,5-di-tert-butyl-4-hydroxyphenyl) acetone mercaptole product is collected as a colorless crystalline solid filter cake. The product is washed with water and aqueous sodium bicarbonate and purified by recrystallization from methanol.

Bis(3,5-di-tert-butyl-4-hydroxyphenyl) butanone mercaptole, melting at 134.1°–135.8°C. is prepared by employing 2,6-di-tert-butyl-4-mercaptophenol and butanone as starting materials. In a representative procedure, about 0.2 mole of the 4-mercaptophenol reactant, 50 milliliters of methanol, a catalytic amount of 0.01 mole of hydrochloric acid, and about 0.13 mole of butanone are mixed and heated at the boiling temperature under reflux for about 2 hours. The product is separated by extraction with benzene followed by evaporation, the acid catalyst being removed by water washing of the benzene extract, and the product is recrystallized from ethanol and found to melt at 134.1°–135.8°C. After further recrystallization from ethanol and drying in air and under reduced pressure the product is found to melt at 135.0°–136.8°C.

Bis(3-tert-butyl-4-hydroxy-5-methylphenyl) acetone mercaptole, melting at 156°–157°C., is prepared in a similar procedure by employing 2-tert-butyl-6-methyl-4-mercaptophenol and acetone as starting materials, in the proportions of two molar proportions of the 4-mercaptophenol reactant to one molar proportion of acetone with methanol as a reaction medium and about 0.01 molar proportion of hydrogen chloride as a catalyst. The product precipitates in the reaction mixture on standing at room temperature. The product is separated by decantation, and purified by conventional techniques including washing an ether solution thereof with water and aqueous sodium hydroxide, evaporating the ether, and recrystallizing the purified product from hexane and from isopropanol in successive recrystallizations.

Bis(3,5-di-tert-butyl-4-hydroxyphenyl)-2-pentanone mercaptole, having a molecular weight of 544.9, melting at 133°–134.4°C., is prepared by employing 2,6-di-tert-butyl-4-mercaptophenol and 2-pentanone as starting materials in a similar procedure.

Bis(3,5-di-tert-butyl-4-hydroxyphenyl) acetaldehyde mercaptal, melting at 92°–96°C., is prepared by employing 2,6-di-tert-butyl-4-mercaptophenol and acetaldehyde as starting materials in a similar procedure.

Bis(3,5-di-tert-butyl-4-hydroxyphenyl)-4-methyl-2-pentanone mercaptole, melting at 126°–130°C., is prepared by employing 2,6-di-tert-butyl-4-mercaptophenol and 4-methyl-2-pentanone as starting materials in a similar procedure.

Bis(3-ethyl-5-tert-butyl-4-hydroxyphenyl)-3-methyl-2-pentanone mercaptole, having a molecular weight of 502.8, is prepared by employing 2-ethyl-6-tert-butyl-4-mercaptophenol and 3-methyl-2-pentanone as starting materials in a similar procedure.

Bis(3-tert-butyl-4-hydroxy-5-isopropylphenyl) acetone mercaptole, having a molecular weight of 488.8, melting at 74°–78°C., is prepared by employing 2-tert-butyl-6-isopropyl-4-mercaptophenol and acetone as starting materials in a similar procedure.

S-(3,5-Di-tert-butyl-4-hydroxyphenyl)-S'-(3-tert-butyl-4-hydroxy-5-isopropylphenyl) acetone mercaptole, having a molecular weight of 502.7, is prepared by mixing equimolar proportions of 2,6-di-tert-butyl-4-mercaptophenol and 2-tert-butyl-4-mercapto-6-isopropylphenol together and mixing the resulting mixture with acetone in a similar procedure. The product is obtained as a mixture with bis(3,5-di-tert-butyl-4-hydroxyphenyl) acetone mercaptole, having a molecular weight of 516.8, and bis(3-tert-butyl-4-hydroxy-5-isopropylphenyl) acetone mercaptole, having a molecular weight of 488.8. The mixture of substituted ketone mercaptole compounds can be used in the method and compositions of the invention.

The following examples illustrate the present invention but are not to be construed as limiting.

EXAMPLE 1

A feed composition consisting of balanced rodent feed was mixed together with various amounts of a substituted ketone mercaptole compound to prepare a series of separate nutritive compositions each containing various percentages from 0.02 to 0.125 percent of one of the substituted ketone mercaptole compounds. Separate groups of male mice were fed for 2 weeks on separate diets consisting of one of the above-described compositions. A separate group of similar mice was similarly fed for two weeks on a similar diet which contained none of a substituted ketone mercaptole compound to serve as a check. At the end of the 2 week period, the mice were exsanguinated under ether anesthesia. Serum cholesterol was determined by taking a 0.05 milliliter aliquot of serum from each mouse and adding the aliquot to 3 milliliters of a 0.08 percent solution of ferric chloride in pure acetic acid. The serum was mixed with the ferric chloride-acetic acid solution and allowed to stand for 10 to 15 minutes to flocculate protein. The protein was precipitated by centrifugation and the clear supernatant was transferred to a stoppered test tube. Two milliliters of sulfuric acid were added to the supernatant and mixed well. The tubes were then left to stand exposed to air for 20 to 30 minutes. Serum cholesterol was determined by measuring percent transmission at a wave length of 560 millimicrons in a spectrophotometer and comparing the percent transmission to that observed with solutions containing known amounts of cholesterol. The serum cholesterol level found in the check group of mice was used as the basis for calculating percentage reduction of cholesterol. The percentage reduction of cholesterol for the particular substituted ketone mercaptole compounds employed and the dosage rate as percent of diet are set out in the following table.

Table I

| Series Number | Substituted Ketone Mercaptole Compound | Dosage Rate as Percent of Diet | Percent Reduction of Cholesterol |
|---|---|---|---|
| 1 | bis(3,5-di-tert-butyl 4-hydroxyphenyl) acetone mercaptole | 0.02 | 25 |
| 2 | do. | 0.04 | 41 |
| 3 | do. | 0.06 | 38 |
| 4 | do. | 0.125 | 65 |
| 5 | bis(3-tert-butyl-4-hydroxy-5-methylphenyl) acetone mercaptole | 0.125 | 25 |
| 6 | bis(3,5-di-tert-butyl-4-hydroxyphenyl) butanone mercaptole | 0.125 | 42 |
| 7 | bis(3,5-di-tert-butyl-4-hydroxyphenyl) 2-pentanone mercaptole | 0.125 | 12 |
| 8 | bis(3-tert-butyl-4-hydroxy-5-isopropylphenyl) acetone mercaptole | 0.125 | 21 |
| 9 | bis(3,5-di-tert-butyl-4-hydroxyphenyl) acetaldehyde mercaptal | 0.125 | 19 |
| 10 | bis(3,5-di-tert-butyl-4-hydroxyphenyl-4-methyl-2-pentanone mercaptole | 0.125 | 14 |

EXAMPLE 2

Toxicity of the compositions of the invention is illustrated by the following procedures:

A group of 5 male and 5 female rats and a separate group of 5 male and 5 female mice were administered an aqueous suspension of bis(3,5-di-tert-butyl-4-hydroxyphenyl) acetone mercaptole in the amount of 5,280 milligrams per kilogram per os and the rats and mice were held for observation. No deaths were observed in a 96 hour period.

Groups of 10 mice each were administered bis(3,5-di-tert-butyl-4-hydroxyphenyl) acetone mercaptole orally at dosage levels of 0.46, 1.0 and 4.6 grams per kilogram in an aqueous methyl cellulose suspension. The mice were held and observed for symtoms of toxicity for 1 week after administration of the above-named compound. No symptoms of toxicity were observed in any of the mice at any dosage level and after 1 week, all the mice appeared normal and healthy.

In similar operations, a group of 4 mice was administered an aqueous methyl cellulose suspension of bis(3,-5-di-tert-butyl-4-hydroxyphenyl) acetone mercaptole in an amount sufficient to provide a dosage rate of 0.4 gram per kilogram by intraperitoneal injection. The mice were held and examined daily for 5 days after administration of the above-named compound for symptoms of toxicity. No symptoms of toxicity were observed and at the end of the 5 day period, the mice appeared healthy and normal.

Four separate groups of 5 male rats each and 4 separate groups of 5 female rats each were fed for 14 days on separate diets containing bis(3,5-di-tert-butyl-4-hydroxyphenyl) acetone mercaptole in varying amounts. One group of male and one group of female rats were fed at each dosage level. The average intake of each rat was determined by weighing the rats and the amount of food consumed. The average daily dosages for the groups of male rats were found to be 333, 871, 1,714 and 3,506 milligrams per kilogram per day, respectively. The average daily dosages for the groups of female rats were found to be 307, 910, 1,891 and 3,852 milligrams per kilogram per day, respectively. To provide a check, similar groups of 5 male and 5 female rats were fed for 14 days on a similar diet containing no substituted ketone mercaptole compound. The behavior and physical condition of the rats were observed daily; the rats were weighed at the beginning of the test and after 7 and 14 days; and the pH and specific gravity of the urine was measured after 14 days. In these observations, no significant differences were observed between the rats fed diets containing bis(3,5-di-tert-butyl-4-hydroxyphenyl) acetone mercaptole and the rats in the check groups. The rats were sacrificed and examined for hematologic changes and for macroscopic and microscopic tissue changes. No significant differences were observed in said tests between the rats administered bis(3,5-di-tert-butyl-4-hydroxyphenyl) acetone mercaptole at any dosage rate and the rats in the check groups.

In other operations, groups of 18 day old female rats were treated by the administration of bis(3,5-di-tert-butyl-4-hydroxyphenyl) acetone mercaptole in a pharmaceutical carrier comprising 20 percent ethanol by volume in polyethylene glycol-200 (a polyethylene glycol having an average molecular weight of about 200). One group of rats was administered the above-named compound at a dosage rate equivalent to 20 milligrams per kilogram and a second group was administered the compound at a dosage rate equivalent to 200 milligrams per kilogram by intraperitoneal injection. Administration of the compositions was carried out daily for three days. Other groups of rats were similarly administered the pharmaceutical carrier but no substituted ketone mercaptole compound to serve as a check. The method of Grauer et al., Proc. Soc. Exper. Biol. and Med. 98:308 (1958) was used to determine estrogenic activity. A comparison of uterine and fluid weights between the groups of rats administered bis(3,5-di-tert-butyl-4-hydroxyphenyl) acetone mercaptole and the check groups of mice administered the ethanol-polyethylene glycol-200 pharmaceutical carrier alone showed no significant difference, thereby indicating that the substituted ketone mercaptole compound has no detectable estrogenic activity.

EXAMPLE 3

A feed composition consisting of balanced rodent feed was mixed together with bis(3,5-di-tert-butyl-4-hydroxyphenyl) acetone mercaptole to prepare a nutritive composition containing 0.06 percent of the test compound. A group of mice (A) was fed this composition for six weeks. A similar group of mice (B) was administered a similar diet containing no substituted ketone mercaptole compound to serve as a check. At the end of the test period, the mice were sacrificed and examined for weight gain and liver weight. Serum cholesterol was determined by the method of Example 1. The weight gain as percent of original weight, serum cholesterol in milligram percent (mg. percent) and liver weight in grams per 100 grams of body weight are set out in the following table.

Table II

| Observation | Group | |
|---|---|---|
| | A | B (Check) |
| Weight gain, percent of original weight | 98 | 89 |
| Liver weight, grams per 100 grams | 5.58 | 5.92 |
| Serum cholesterol, mg. percent | 72 | 166 |

EXAMPLE 4

A feed composition consisting of balanced rodent mash was mixed together with sufficient bis(3,5-di-tert-butyl-4-hydroxyphenyl acetone mercaptole to prepare a nutritive composition containing 4.8 percent of the substituted ketone mercaptole compound. Separate groups of five male and five female rats were fed for two weeks on separate diets consisting of the above-described composition. Separate groups of male and female rats were fed for 2 weeks on a similar diet containing no substituted ketone mercaptole compound to serve as a check. The average rate of daily intake for each rat was calculated on the basis of average daily food consumption. The male rats were found to consume the test compound in the amount of 3,506 milligrams per kilogram per day and the female rats were found to consume the test compound in the amount of 3,852 milligrams per kilogram per day. There was no significant difference between the average daily food consumption of the rats fed the test diet and the check groups. At the end of the 14 day period, the rats were sacrificed and serum cholesterol was determined by the method described above in Example 1. The male rats in the check group were found to have a serum cholesterol content of 64 milligram percent and the female rats in the check group were found to have an average serum cholesterol content of 80 milligram percent. The male and female rats administered bis(3,5-di-tert-butyl-4-hydroxyphenyl) acetone mercaptole were found to have serum cholesterol contents of 44 and 43 milligram percent, respectively.

EXAMPLE 5

Three groups of mongrel dogs, one male and one female dog per group, were administered bis(3,5-di-tert-butyl-4-hydroxyphenyl) acetone mercaptole at various dosage rates for 14 days. The dogs were administered the test compound orally in gelatin capsules to provide dosage rates for each group of dogs at (A) 750, (B) 1,500 and (C) 3,000 milligrams per kilogram per day, respectively. A similar pair of one male and one female dogs was held for 14 days to serve as a check. During the 14 day period, the behavior and physical condition of the dogs were observed and the dogs were weighed periodically. No significant difference was observed between the dogs administered the test compound and the dogs in the control group. At the end of the 14 day period, the dogs were sacrificed and a complete blood count, packed cell volume determination, hemoglobin count, red blood cell count and white blood cell count were made. Necropsy on all dogs was done to determine the macroscopic and microscopic effects of the test compound on the animals. Urinalysis was conducted on all dogs to determine the pH, specific gravity, bilirubin, blood sugar, protein and ketone evaluation. In these determinations, no significant differences were observed between the dogs administered bis(3,5-di-tert-butyl-4-hydroxyphenyl) acetone mercaptole and the dogs in the check group. Serum cholesterol content was determined for each dog. The serum cholesterol content for each dog, the dosage of bis(3,5-di-tert-butyl-4-hydroxyphenyl) acetone mercaptole in milligrams per kilogram per day (mg/kg/day) for each group and the sex of each dog (M, F) are set out in Table III.

Table III

| Test Diet | Sex | Serum Cholesterol Milligram Percent |
|---|---|---|
| Check | M | 164 |
|  | F | 176 |
| A 750 mg/kg/day | M | 76 |
|  | F | 88 |
| B 1500 mg/kg/day | M | 94 |
|  | F | 82 |
| C 3000 mg/kg/day | M | 64 |
|  | F | 52 |

EXAMPLE 6

Groups of mice were administered bis(3,5-di-tert-butyl-4-hydroxyphenyl) acetone mercaptole by intraperitoneal injection of a peanut oil solution of the above-named compound at a dosage rate of 100 milligrams per kilogram. The animals were so treated daily for ten days to provide a total of ten injections per mouse. A similar group of mice was treated by the intraperitoneal injection of a similar amount of peanut oil but was not administered a substituted ketone mercaptole compound to serve as a check. After the last dosage was administered, the animals were exsanguinated under ether anesthesia and examined for serum cholesterol by the procedure set out above in Example 1. The mice treated with bis(3,5-di-tert-butyl-4-hydroxyphenyl) acetone mercaptole were found to have serum cholesterol levels of from 30 to 60 percent below the serum cholesterol levels of the mice in the check group.

EXAMPLE 7

A group of 5 male monkeys was administered bis(3,-5-di-tert-butyl-4-hydroxyphenyl) acetone mercaptole at a dosage rate of 200 milligrams per kilogram per day for 4 weeks. The named substituted ketone mercaptole compound was suspended in aqueous methyl cellulose and artificial flavoring was added. The compound was administered orally in two equal doses daily before feeding. Blood samples were taken for 3 consecutive weeks before treatment with bis(3,5-di-tert-butyl-4-hydroxyphenyl) acetone mercaptole and were taken thereafter at 2 week intervals. The samples were analyzed for serum cholesterol by the method set out above in Example 1. The serum cholesterol levels observed in the blood samples taken after treatment with bis(3,5-di-tert-butyl-4-hydroxyphenyl) acetone mercaptole was begun were about 30 percent lower than the serum cholesterol levels observed before treatment.

EXAMPLE 8

A mixture of 500 parts of bis(3,5-di-tert-butyl-4-hydroxyphenyl) acetone mercaptole, 94 parts of maize starch, 45 parts of alginic acid and 3.5 parts of magnesium stearate is compressed into slugs which are then broken into granules. The granules are passed through an eight-mesh screen and 3.5 parts of magnesium stearate are added. The mixture is then compressed into tablets weighing two grams each and which are suitable for oral administration.

EXAMPLE 9

100 Parts of bis(3-tert-butyl-4-hydroxy-5-isopropyl) acetone mercaptole and 5 parts of wheat germ oil are mixed well with 750 parts of sunflower seed oil. The mixture is filled into gelatin capsules in the amount of 1.5 grams per capsule. The capsules are suitable for oral administration.

EXAMPLE 10

One part of bis(3,5-di-tert-butyl-4-hydroxyphenyl) acetone mercaptole is dissolved in 4 parts of acetone and the solution is mixed with 3 parts of silica gel to adsorb the substituted ketone mercaptole compound on the silica gel. The bis(3,5-di-tert-butyl-4-hydroxyphenyl) acetone mercaptole adsorbed on the silica gel is dried to obtain a concentrated composition containing 25 percent of the active ingredient.

A series of similar compositions are similarly prepared containing one of bis(3-tert-butyl-4-hydroxy-5-methylphenyl) 2-pentanone mercaptole, bis(3-tert-butyl-5-ethyl-4-hydroxyphenyl acetone mercaptole, bis(3-tert-butyl-4-hydroxy-5-propylphenyl) acetone mercaptole, bis(3-tert-butyl-5-isobutyl-4-hydroxyphenyl) acetone mercaptole, bis(3-tert-butyl-4-hydroxy-5-isopropylphenyl) butanone mercaptole, S-(3,5-di-tert-butyl-4-hydroxyphenyl)-S'-(3-tert-butyl-4-hydroxy-5-propylphenyl) acetone mercaptole and bis(3,5-di-tert-butyl-4-hydroxyphenyl)-4-methyl-2-pentanone mercaptole.

EXAMPLE 11

0.5 Part of each concentrated composition of Example 10 is mixed with 99.5 parts of standard animal feed on a conventional roller mill. There is thus obtained a series of nutritive compositions suitable for oral administration to animals for the purpose of lowering serum cholesterol.

EXAMPLE 12

Twenty milliliters of ethanol are diluted with 80 milliliters of polyethylene glycol-200 to make a total of 100 milliliters of liquid. Two grams of bis(3,5-di-tert-butyl-4-hydroxyphenyl) acetone mercaptole are dissolved in the ethanol-polyethylene glycol-200 mixture and the solution is sterilized. There is thus obtained a composition suitable for injection for the purpose of lower serum cholesterol. Injection of 5 milliliters of the composition supplies 100 milligrams of the active ingredient.

200 Milliliters of ethanol are diluted with 800 milliliters of polyethylene glycol-200 to make a total of one liter of liquid. Twenty grams of bis(3,5-di-tert-butyl-4- hydroxyphenyl) butanone mercaptole are dissolved in the ethanol-polyethylene glycol-200 mixture. There is thus obtained a composition suitable for mixture with suitable flavoring and coloring agents to obtain a composition for oral administration. One fluid ounce of the composition contains about 590 milligrams of the named substituted ketone mercaptole compound.

EXAMPLE 13

25 Parts of sodium glycerophosphate, 25 parts of calcium glycerophosphate and 50 parts of bis(3,5-di-tert-butyl-4-hydroxyphenyl) butanone mercaptole are intimately mixed. The mixture is added gradually to 900 parts of soluble casein in a conventional mixer and mixing is continued until the composition is homogenous. There is thus obtained a concentrated dietary supplement containing 5 percent of the active ingredient which is suitable for addition to foodstuffs for oral administration.

100 Parts of bis(3,5-di-tert-butyl-4-hydroxyphenyl) butanone mercaptole, 100 parts of bis(3-tert-butyl-5-ethyl-4-hydroxyphenyl) acetone mercaptole, 0.6 part of pyridoxine hydrochloride, 15 parts of ascorbic acid and 10 parts of nicotinic acid are mixed well with conventional mixing equipment. The mixture is then intimately mixed with 250 parts of soluble casein to prepare a concentrated nutritive composition which can be employed as a dietary supplement adapted to be mixed with other foodstuffs for oral administration.

EXAMPLE 14

100 Parts of bis(3,5-di-tert-butyl-4-hydroxyphenyl) acetone mercaptole are dissolved in 750 parts of peanut oil. The solution is filled into gelatin capsules in the amount of 1 gram per capsule. The capsules are suitable for oral administration.

90 Parts of bis(3,5-di-tert-butyl-4-hydroxyphenyl) butanone mercaptole are mixed with 10 parts of maize starch. The mixture is then filled into gelatin capsules in the amount of 1 gram per capsule. The capsules are suitable for oral administration.

Ten parts of bis(3-tert-butyl-4-hydroxy-5-isopropylphenyl) acetone mercaptole are mixed with 10 parts of bis(3,5-di-tert-butyl-4-hydroxyphenyl) 2-pentanone mercaptole and 3 parts of milk sugar. The mixture is filled into gelatin capsules in the amount of 1.6 grams per capsule to provide capsules suitable for oral administration.

EXAMPLE 15

To a mixture of 40 parts of bis(3,5-di-tert-butyl-4-hydroxyphenyl) butanone mercaptole and 33.7 parts of liquid paraffin are added 3 parts of gum acacia and 1.5 parts of gum tragacanth. The mixture is thoroughly triturated and is added slowly with stirring to a solution of 0.1 part of a cetyl alcohol polyoxyethylene condensate, 40 parts of cane sugar, 0.03 part of propyl p-hydroxybenzoate, 0.3 part of methyl p-hydroxybenzoate and 0.002 part of edible dyestuff in 110 parts of water. A suitable flavoring agent is added and the mixture is homogenized by passing through a conventional homogenizer to obtain an emulsion suitable for oral administration.

EXAMPLE 16

Tablets are prepared from a granulation comprising 250 parts by weight of bis(3,5-di-tert-butyl-4-hydroxyphenyl) acetone mercaptole, 50 parts lactose, 3.5 parts magnesium stearate, 20 parts starch, 50 parts microcrystalline cellulose, one part of a polyoxyethylene sorbitan monooleate surface active dispersing agent and 0.4 part of F.D. and C. approved color. The granulation is screened and compressed into tablets weighing about 0.287 gram each to prepare a composition in dosage unit form adapted for oral administration to animals. Excellent reductions in serum cholesterol levels are obtained when such tablets are administered to animals at the rate of one or more tablets (each containing 250 milligrams of bis(3,5-di-tert-butyl-4-hydroxyphenyl) acetone mercaptole) per day.

EXAMPLE 17

250 parts by weight of bis(3,5-di-tert-butyl-4-hydroxyphenyl) acetone mercaptole is dispersed in a mixture of 385 parts by weight of diethyl succinate, 125 parts by weight of ethyl linoleate and 125 parts by weight of a surface active dispersing agent (polyoxyethylene sorbitan monooleate). The mixture is filled into soft gelatin capsules in the amount of 0.76 milliliter per capsule to obtain a dosage unit form containing about 0.250 gram of substituted ketone mercaptole per unit. The capsules are adapted to be administered orally to animals to provide a hypocholesteremic amount of substituted ketone mercaptole compound.

What is claimed is:

1. A method for lowering serum cholesterol levels in animals comprising administering to an animal a hypocholesteremic amount of a compound corresponding to the formula

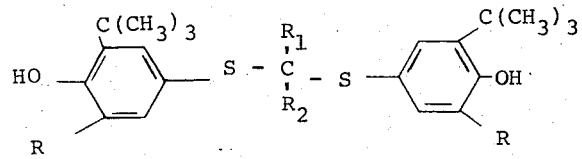

wherein R in each occurrence thereof independently represents loweralkyl of from one to four carbon atoms, inclusive, $R_1$ represents methyl, and $R_2$ represents methyl or ethyl.

2. The method of claim 2 wherein R represents tertiary butyl.

3. The method of claim 1 wherein the compound is administered orally.

4. The method of claim 1 wherein the compound is bis(3,5-di-tert-butyl-4-hydroxyphenyl) acetone mercaptole.

5. The method of claim 1 wherein the compound is bis(3,5-di-tert-butyl-4-hydroxyphenyl) butanone mercaptole.

6. The method of claim 1 wherein the compound is bis(3-tert-butyl-4-hydroxy-5-isopropylphenyl) acetone mercaptole.

7. The method of claim 1 wherein the compound is bis(3-tert-butyl-4-hydroxy-5-methylphenyl) acetone mercaptole.

8. A composition for lowering serum cholesterol levels in animals comprising a pharmaceutical carrier having incorporated therein from about 0.02 to about 90 percent by weight of a compound corresponding to the formula

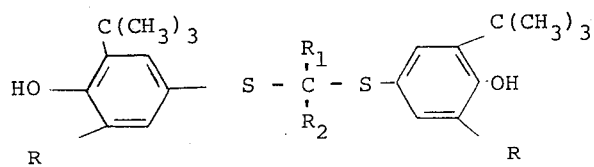

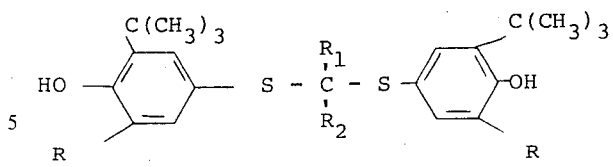

wherein R in each occurrence thereof independently represents loweralkyl of from one to four carbon atoms, inclusive, $R_1$ represents methyl, and $R_2$ represents methyl or ethyl.

9. The composition of claim 8 further comprising a surface active dispersing agent.

10. The composition of claim 8 wherein the compound is bis(3,5-di-tert-butyl-4-hydroxyphenyl) acetone mercaptole.

11. A composition for lowering serum cholesterol levels in animals, said composition being in dosage unit form adapted for administration to animals, each dosage unit containing from about 100 milligrams to about 5 grams per unit of a substituted ketone mercaptole compound corresponding to the formula wherein R in each occurrence thereof independently represents loweralkyl of from one to four carbon atoms, inclusive, $R_1$ represents methyl, and $R_2$ represents methyl or ethyl, incorporated in a pharmaceutical carrier.

12. The composition of claim 11 wherein the dosage unit is in a form adapted for oral administration to animals.

13. The composition of claim 12 wherein $R_2$ represents methyl.

14. The composition of claim 13 wherein the compound is bis(3,5-di-tert-butyl-4-hydroxyphenyl) acetone mercaptole.

15. The composition of claim 14 wherein the dosage unit is in a form adapted for oral administration to animals.

16. The composition of claim 15 wherein the pharmaceutical carrier comprises a surface-active dispersing agent.

* * * * *